United States Patent Office

3,632,534
Patented Jan. 4, 1972

3,632,534
HYDROPHILIC GELATIN LAYERS COMPRISING AS ADDITIVES LATICES CONTAINING FLUOROALKYL GROUPS
August Jean van Paesschen, Antwerp, and Jan Jozef Priem, Berchem, Belgium, assignors to Gevaert-Agfa N.V., Mortsel, Belgium
No Drawing. Filed July 3, 1967, Ser. No. 650,577
Int. Cl. C08h 7/06; G03c 1/72
U.S. Cl. 260—8                      4 Claims

ABSTRACT OF THE DISCLOSURE

Hydrophilic layers useful as a binding agent for light-sensitive silver-halide emulsions are described which comprise a hydrophilic colloid and at least one latice having the same transparency in the wet and dry state characterized in that the refractive index of the dispersed polymer of the latex or of the mixture of the dispersed polymers of the latices is between 1.38 and 1.44, at least one of the latices being formed by emulsion homo-polymerization or co-polymerization of monomers containing fluoroalkyl groups.

---

The invention relates to the use of latices containing fluoroalkyl groups as additives for hydrophilic layers, more particularly for photographic gelatin layers.

In the photographic industry gelatin is in practice almost the only protective colloid and binding agent used for light-sensitive compounds.

Contrary to its unique photographic properties the mechanical properties of this natural polymer are not so extraordinary; its mechanical properties must be improved by means of additives. For instance its dimensional stability is improved by addition of hardening agents; by the addition of softening agents gelatin becomes less brittle and shows less tendency to curling; by the addition of matting agents it becomes less sticky.

In the last years use has been made more and more frequently of polymer dispersions as additives for gelatin layers, for instance as softening agents, as matting agents or as colour couplers.

In order to be appropriate for addition to photographic gelatin layers the latex additives should meet among others the following requirements:

The polymer dispersion should be photographically inert i.e. it should be completely free of ingredients which would influence the classical photographic formation of metallic silver from silver halide;

The polymer dispersion should be miscible with the gelatin emulsion i.e. it should not give rise to complete or partial coagulation.

Moreover in each separate case the polymer dispersion should meet more specific requirements e.g. if the polymer dispersion is to be added as softening agent, the latex polymers should have softening properties and should be film-forming; when the polymer dispersion is to be added as matting agent the latex particles should be hard.

In a gelatin layer, a polymer dispersion is always present as a heterodispersed phase. This heterodispersity is responsible for a disadvantageous side effect i.e. it increases the milky appearance of the layer in wet state. In the case of photographic paper as well as in the case of normal film materials which are always examined in dry state this dullness is of less importance. In other film materials, however, which are inspected in wet state as is the case with graphic or X-ray photographic materials, this increased dullness in wet state could be disturbing.

The transparency of a layer with heterodispersed foreign ingredients depends on the difference in refractive index of the binding agent and of the dispersed phase. In a layer consisting of a hydrophilic binding agent and a hydrophobic dispersed phase, this phenomenon shows a twofold aspect: the binding agent has two refractive indices according to whether it is in dry state (dry gelatin: $n=1.55$; dry polyvinyl alcohol: $n=1.52$) or whether it is in wet state. The refractive index of a moist layer is difficult to give accurately because it is dependent on the amount of water absorbed by the hydrophilic layer. For photographic gelatin this is amongst others dependent on the kind of gelatin, the degree of hardening and the presence of salts. When it is assumed that gelatin can absorb practically four times its weight of water the refractive index of the wet layer is about 1.38, since the value of the refractive indices of mixtures of water and gelatin vary practically linearly between the value for dry gelatin ($n=1.55$) and for water ($n=1.33$). As a matter of fact gelatin, in normal circumstances, always has a certain moisture content ($n \approx 1.5$).

However, the refractive index of the hydrophobic latex particles remains in the dry and wet layer unchanged and is only determined by the chemical composition of the polymers used.

In the following table the refractive indices are listed of some known hydrophobic polymers.

TABLE

| Polymer: | $n$ |
|---|---|
| Polystyrene | 1.59–1.60 |
| Polyethylene | 1.51–1.52 |
| Poly(vinyl chloride) | 1.53–1.55 |
| Poly(methyl methacrylate) | 1.49 |
| Polybutadiene | 1.52 |
| Poly(ethyl acrylate) | 1.48 |
| Poly(vinyl acetate) | 1.47 |

In dry layers the refractive indices of gelatin and most of the known polymers lie very close to each other and thus very clear layers can be obtained. In wet state, however, the refractive index of the moist gelatin layer decreases to about 1.38. Since the refractive index of the hydrophobic latex particles remains unchanged, a large number of interfaces are created between phases with different refractive index, which results in a pronounced dullness of the layer. The same is applicable to other hydrophilic binding agents such as polyvinyl alcohol.

The ideal solution would be that the refractive index of the latex particles varies in the same way as that of the gelatin or of the other hydrophilic binding agents. However, up till now the synthesis of suchlike latices appeared to be impossible.

It is an object of the present invention to propose another solution to this problem of the varying difference in refractive indices in dry or wet state. Indeed, it was found that by addition of dispersions of polymers with a refractive index of about 1.42, preferably comprised between 1.38 and 1.44, to aqueous solutions of hydrophilic polymers it is possible to obtain layers having the same transparency or dullness in both dry and wet state.

When dispersions of hydrophobic polymers, having a refractive index larger than $n=1.44$, are mixed with gelatin or another hydrophilic binding agent, layers are obtained which are more mat in wet state than in dry state.

On the contrary when dispersions of polymers having a refractive index lower than 1.38 are added, layers are obtained which are generally more mat in dry state than in wet state. By using dispersions of polymers according to the present invention and having a refractive index comprised between 1.38 and 1.44, layers are obtained which have both in dry and wet state the same transparency or dullness because in wet as well as in dry state almost the same difference exists between the refractive index of the hydrophilic binding agent and that of the latex.

According to the present invention hydrophilic layers are provided comprising a hydrophilic colloid and one or more latices and having the same transparency in wet as well as in dry state, characterized in that the refractive index of the dispersed polymer of the latex or of the mixture of the dispersed polymers of the latices is comprised between 1.38 and 1.44, at least one of said latices being formed by emulsion homopolymerisation or copolymerisation of monomers containing fluoroalkyl groups represented by the formula:

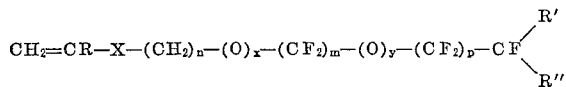

wherein:

X represents a —COO— group, a —OCO— group, a —CONH— group or a —O— group,
each of R' and R" (the same or different) represents hydrogen or fluorine atoms,
R represents a hydrogen atom or a methyl group,
$n$ is 0, 1 or 2,
each of $x$ and $y$ (the same or different) is 0 or 1, and
each of $m$ and $p$ (the same or different) is 0 or an integer from 1 to 10.

Examples of ethylenically unsaturated compounds carrying fluoroalkyl groups are:

(1) Vinyl esters corresponding to the general formula:

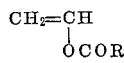

| R: | Refractive index of the polymer ($n$) |
|---|---|
| —$(CF_2)_2CF_3$ | 1.35 |
| —$(CF_2)_3CF_3$ | 1.35–1.36 |
| —$(CF_2)_4CF_3$ | 1.36 |
| —$(CF_2)_8CF_3$ | 1.36 |
| —$CH_2(CF_2)_4CF_2H$ | 1.36 |

(2) Acrylates corresponding to the formula:

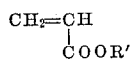

| R': | $n$ |
|---|---|
| $CH_2CF_2CF_3$ | 1.385 |
| $CH_2(CF_2)_2CF_3$ | 1.367 |
| $CH_2CF_2CFHCF_3$ | 1.392 |
| $CH_2(CF_2)_3CF_3$ | 1.360 |
| $CH_2(CF_2)_3CF_2H$ | 1.380 |
| $CH_2(CF_2)_4CF_3$ | 1.356 |
| $CH_2(CF_2)_5CF_2H$ | 1.365 |
| $CH_2(CF_2)_6CF_3$ | 1.339 |
| $CH_2CH_2OCH_2(CF_2)_2CF_3$ | 1.390 |
| $CH_2(CF_2)_2OCF_3$ | 1.360 |
| $CH_2(CF_2)_2OCF_2CF_3$ | 1.348 |
| $CH_2(CF_2)_2O(CF_2)_2CF_3$ | 1.346 |
| $CH_2(CF_2)_2O(CF_2)_3CF_3$ | 1.346 |
| $CH_2CH_2OCH_2CF_3$ | 1.419 |
| $CH_2CH_2OCF_2CF_2H$ | 1.412 |
| $(CH_2CH_2O)_2CF_2CF_2H$ | 1.422 |

(3) Methacrylates corresponding to the formula:

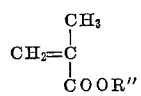

| R": | $n$ |
|---|---|
| —$CH(CH_3)CF_3$ | 1.418 |
| —$CH_2CF_3$ | 1.437 |

In addition to the esters of acrylic acid and methacrylic acid may be mentioned: the fluoroalkyl esters of itaconic acid, maleic acid, fumaric acid as well as the fluoroalkyl acryl amides, fluoroalkyl vinyl ethers, etc. in other words polymers or copolymers carrying such a number of fluoroalkyl groups substituted on the polymer chain that the refractive index of the (co)polymer or of the mixture with other polymers is about 1.42, more generally between 1.38 and 1.44.

In the above list besides each separate monomer containing fluoroalkyl groups is given the refractive index of the respective polymer. When the refractive index of the polymer would be lower than 1.38 the monomer concerned can be copolymerised with other monomers, from which polymers are made have a higher refractive index, to such an extent that the refractive index of the resulting copolymer lies between 1.38 and 1.44. Attention should be further drawn to the fact that the refractive index of a mixture of different polymers is practically linearly related to the refractive indices of the component polymers. Consequently, it is possible to adapt the very low refractive index of a certain latex by mixing it with the latex of another polymer having too high a refractive index so that the refractive index of the mixture finally obtained falls within the limits given.

The hydrophilic compositions formed from mixtures of hydrophilic colloids with latices of homopolymers and copolymers as well as with mixtures of polymer latices according to the invention can be used in all applications wherein the hydrophilic colloids have been used up till now in photographic layers or coatings, such as in photographic light-sensitive layers based on silver halide or on other light-sensitive compounds.

The compositions are particularly desirable where cracking, which often characterises gelatin coatings of substantial thickness, has been detrimental to the use of gelatin itself. The latices, when employed in gelatino photographic emulsions, give rise to emulsions, from which coatings of good flexibility are obtained, even in the form of layers having substantial thickness.

The hydrophilic composition of the invention may also be used for the production of delustered photographic materials and more particularly of delustered silver halide photographic emulsions and emulsion layers and of photographic elements bearing delustered water-permeable colloid layers. At a desirable concentration of the polymer particles in the layer the desired degree of minute roughening is produced. This roughness is not apparent to glance or touch and ordinarily the user will not be aware of its existence. This coating very noticeably decreases abrasion marks which ordinarily would be present in the developed film. Newton's rings are also avoided since the roughnesses, which are practically invisible, are sufficient to prevent intimate contact between the negative and the printing material or any glass plate.

The most important thing, however, is that in wet as well as in dry state the photographic materials in which the hydrophilic compositions are used show the same transparency so that in the case of special materials, which are normally examined in wet state, this examination can be achieved without difficulty.

The following examples illustrate the invention.

EXAMPLE 1

(A) Preparation of the latex of poly(dodecylfluoroheptyl acrylate)

In a 250 cc. reaction vessel fitted with a stirrer, reflux condenser and a nitrogen inlet, 45 cc. of water, which has been boiled previously under nitrogen, are placed. Then 24 cc. of a 10% aqueous solution of sodium oleylmethyl tauride and 30 g. of dodecylfluoroheptyl acrylate are added. The latter product has been prepared according to Example 1 of U.S. patent specification 2,628,988.

After having rinsed with nitrogen, 150 mg. of the sodium salt of 4,4'-azo-bis(4-cyano-valeric acid) are added as initiator while stirring. After 1 hour of polymerisation at 80° C., another 60 mg. of initiator are added and heating is continued for 1 hour at 80° C. and for 1 hour at 90° C. while stirring. After having been cooled the latex is filtered off. About 90 cc. of latex containing 18% of solids and having pH 6.7, are obtained.

The refractive index of the polymer is 1.365. The intrinsic viscosity of the polymer measured in tetrahydrofurane at 25° C. is 0.50 dl./g.

Analogous results are obtained with potassium persulphate as initiator and by using as emulsifying agents the sodium salt of dioctyl sulphosuccinic acid or a sodium alkylsulphonate with formula Kogasin II—$CH_2$—$SO_3Na$ wherein Kogasin II is a mixture of saturated carbohydrates having a boiling point comprised between 230 and 320° C.

(B) Preparation of the latex of poly(ethyl acrylate)

This latex is prepared in an analogous way as described under A starting from ethyl acrylate and using potassium persulphate as initiator. The latex contains 20% of solids and has a pH of 5.3. The refractive index of the polymer is 1.48. The intrinsic viscosity of the polymer in acetone at 25° C. is 1.2 dl./g.

(C) Preparation of latices of copolymers of ethyl acrylate and dodecylfluoroheptyl acrylate Latices of the above copolymers comprising 20, 40, 60 and 80% by weight of ethyl acrylate are prepared analogously as described in A with potassium persulphate as initiator and sodium oleylmethyl tauride as emulsifying agent.

(D) Transparency of gelatin/latex layers

On glass plates, layers are coated from equal parts of gelatin and latex. After having dried the layers, the glass plates are half dipped in water for some minutes. The transparency in wet and dry state is judged visually. Very small differences in dullness due to light diffusion can be observed by varying the angle of incidence of the light. The results are given in Table 1 for gelatin mixed with latices of copolymers of ethyl acrylate and dodecylfluoroheptyl acrylate or for mixtures of gelatin and of poly(ethyl acrylate) and of poly(dodecylfluoroheptyl acrylate).

g. of m-dinitrobenzene being dissolved in the acid chloride as polymerisation inhibitor. After the slightly exothermic reaction, stirring is continued for about 30 min. at room temperature and for about 1 hour at reflux temperature. Then the reaction mixture is poured into an excess of N hydrochloric acid, washed with water till neutral and dried over magnesium sulphate. The dried trifluoroethyl methacrylate is fractionated B.P.$_{.8 mm.}$=21° C.
$n_D^{25}$=1.3625

A 20% latex of poly(trifluoroethyl methacrylate) is prepared according to the method described in Example 1, using Kogasin II —$CH_2$—$SO_3Na$ as emulsifying agent and potassium persulphate as initiator.

The intrinsic viscosity in acetone at 25° C. of the polymer obtained is 3.28 dl./g. The polymer has a refractive index of 1.418.

A dispersion of equal parts of gelatin and poly(trifluoroethyl methacrylate) to which 5% of sodium oleylmethyl tauride has been added gives rise to the formation of transparent layers when coated on glass plates and when dried, which layers keep their transparency in wet as well as in dry state.

EXAMPLE 3

To 20 cc. of a 10% aqueous solution of poly(vinyl alcohol) 2 cc. of a 5% aqueous solution of dimethylol urea are added. Immediately thereafter 20 cc. of a 10% latex of trifluoroethyl acrylate are very slowly added while stirring. The latex was prepared as described in Example 2, with the difference, however, that the methacrylic acid chloride was replaced by acrylic acid chloride.

2.5 cc. of the mixture obtained is poured onto a glass plate. The film obtained is dried to the air at room temperature and then heated for 2 hours at 60° C. in a drying oven.

A uniformly mat film is obtained which keeps its dullness even after being dipped in demineralized water for 2 min.

EXAMPLE 4

A silver chlorobromide emulsion (35% of bromide)

TABLE 1

| Percent of dodecylfluoroheptyl acrylate in the copolymer=c; mixture=m | Refractive index | | Transparency of dry layer | Transparency of wet layer | Difference in transparency between the wet and dry layer |
|---|---|---|---|---|---|
| | Theoretical calculated from literature | Measured | | | |
| Polyethylacrylate | 1.48 | | Clear | Slightly mat | More pronounced. |
| 20 (m) | 1.457 | | do | Clear | No. |
| 25 (c) | 1.451 | 1.458 | do | do | No. |
| 40 (m) | 1.434 | | do | do | No. |
| 40 (c) | 1.434 | 1.441 | do | do | No. |
| 50 (m) | 1.425 | | do | do | No. |
| 60 (c) | 1.411 | 1.416 | do | do | No. |
| 80 (m) | 1.388 | | do | do | No. |
| Polydodecylfluoroheptyl acrylate | 1.365 | | Slightly mat | do | More pronounced. |

From the table it appears that when in an amount of gelatin an equal amount of a latex of copoly(ethyl acrylate/dodecylfluoroheptyl acrylate) (50/50) is dispersed or when in an amount of gelatin an equal amount of a mixture (50/50) of latices of poly(dodecylfluoroheptyl acrylate) and of poly (ethylacrylate) is dispersed, practically no difference in transparency can be observed between the wet and dry part of the plate. The difference in transparency gradually increases or decreases; it remains, however, slight for compositions comprising from 40 to 80% of dodecylfluoroheptyl acrylate, which practically corresponds with refractive indices of the copolymer or of the mixture of polymers comprised between 1.385 and 1.435.

EXAMPLE 2

To a solution of 1 mole of trifluoroethanol in 230 cc. of anhydrous pyridine 1.2 mole of methacrylic acid chloride is dropwise added while stirring in about 20 min., 1 for graphic purposes is prepared according to known methods starting from silver nitrate, sodium chloride, ammonium bromide and gelatin. After having been washed for removing the soluble salts this emulsion is chemically ripened in the presence of active gelatin and optical sensitizers.

To 1 kg. of this emulsion comprising 50 g. of silver halide and 30 g. of gelatin, 5-methyl-7-hydroxy-s-triazole-(1,5-a)-pyrimidine is added as stabiliser and saponine as moistening agent.

The emulsion obtained is divided into three parts. To the first part no additives are added. To the second part 7.5 g. of the latex of the copolymer of ethyl acrylate and dodecylfluoroheptyl acrylate (40/60) prepared as described in Example 1, C are added per kg. of emulsion. To the third part 7.5 g. of the latex of polyethyl acrylate prepared as described in Example 1, B are added per kg. of emulsion.

Each of the three separate emulsions is then coated according to known methods on photographic supports in such a way that 8 g. of silver are present per sq. m. The three strips of photographic material are then developed for 2½ min. in a developing bath of the following composition:

|  | G. |
|---|---|
| Sodium bisulphite | 1.5 |
| Hydroquinone | 17 |
| Formaldehyde bisulphite | 60 |
| Sodium carbonate (anhydrous) | 60 |
| Sodium bicarbonate (anhydrous) | 15 |
| Potassium bromide | 1 |
| Water up to 1000 cc. | |

Then the materials are fixed in a normal fixing bath and rinsed.

When the three unexposed strips have been developed, fixed and rinsed in the above way a noticeable difference in transparency can be observed:

(1) The test material without additives and the strip containing latex of copoly(ethylacrylate/dodecylfluoroheptyl acrylate) are very transparent in wet state;

(2) The test material with latex of poly(ethyl acrylate) in wet state, is slightly mat when viewed by reflection, and has a slightly yellow outlook when viewed by transmitted light;

(3) After having been dried all strips are equally transparent. Thus we may conclude that a photographic emulsion containing a latex from a monomer containing fluoroalkyl groups according to the invention is equally transparent in wet as well as in dry state.

When the latices according to the invention are added to photographic emulsions, which are intended for application to a polyester support, it was moreover found that after development, fixing, rinsing and drying a markedly improved adhesion to the support is obtained. This can be examined as follows. A photographic silver chlorobromide emulsion prepared as described above is coated on a subbed polyester support. To a same silver chlorobromide emulsion is added as described above a latex of the copolymer of ethyl acrylate and dodecylfluoroheptyl acrylate (40/60) and this emulsion too is coated on a subbed polyester support. On both strips scratches are made crosswise in the emulsion by means of a sharp knife. These scratches are then covered with an adhesive tape, which is very well pressed against the material. After 24 hours the adhesive tape is removed at once. In the case of the material containing no additives large pieces of emulsion are torn loose from the support. In the case, however, of the material containing the latex the emulsion remains firmly adhering to the support.

When the latices, prepared from monomers containing fluoroalkyl groups according to the invention, are added to photographic emulsions intended for application to a cellulose acetate support, they also show the advantage of rendering the film markedly less brittle. This can be examined by measuring the number of folds the material can withstand before breaking, according to the method described in A.S.A. Standard PH 1.31–1958 (American Standard Method for Determining the Brittleness of Photographic Film).

When the test is carried out at 30% relative humidity O folds can be made with the blank material (containing no latex). The photographic material containing the latex of the copolymer of ethyl acrylate and dodecyl fluoroheptyl acrylate (40/60) withstands 12 folds.

We claim:

1. Hydrophilic layers comprising gelatin and a polymer latex having the same transparency in wet as well as in dry state, characterized in that the refractive index of the polymer latex is comprised between 1.38 and 1.44, said latex having been formed by emulsion homopolymerisation or copolymerisation of monomers containing fluoroalkyl groups and corresponding to the formula:

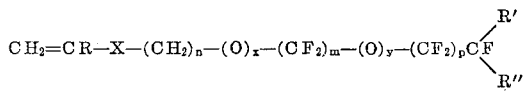

wherein:

X is —COO—, —OCO—, —CONH— or —O—,

R is hydrogen or methyl, each of R' and R" (the same or different) is hydrogen or fluorine, $n$ is 0, 1 or 2, each of $x$ and $y$ (the same or different) is 0 or 1, and each of $m$ and $p$ (the same or different) is 0 or an integer from 1 to 10.

2. Hydrophilic layers according to claim 1, wherein the latex has been formed by emulsion homopolymerisation or copolymerisation of a fluoroalkyl (meth) acrylate embraced by the structural formula of claim 1.

3. Hydrophilic layers according to claim 1, wherein the latex has been formed by emulsion copolymerisation of an alkyl (meth) acrylate and a fluoroalkyl (meth) acrylate embraced by the structural formula of claim 1.

4. Hydrophilic layers according to claim 1, wherein there has been added to the hydrophilic colloid a mixture of (A) a latex formed by emulsion homopolymerisation or copolymerisation of a fluoroalkyl (meth) acrylate embraced by the structural formula of claim 1 and (B) a latex of an alkyl (meth) acrylate.

References Cited

UNITED STATES PATENTS

| 2,591,542 | 4/1952 | Harriman | 99—111 X |
| 2,642,416 | 6/1953 | Ahlbrecht et al. | 260—83.5 |
| 3,102,103 | 8/1963 | Ahlbrecht et al. | 260—486 X |
| 3,282,905 | 11/1966 | Fasick et al. | 260—85.7 X |
| 3,378,609 | 4/1968 | Fasick et al. | 260—89.5 X |
| 3,382,077 | 5/1968 | Himmelman et al. | 260—8 X |

HOWARD E. SCHAIN, Primary Examiner

U.S. Cl. X.R.

96—114, 115 P; 260—83.5, 85.7, 89.5 H